United States Patent
Rhodes

(10) Patent No.: US 6,722,358 B2
(45) Date of Patent: Apr. 20, 2004

(54) INTEGRAL COLLECTOR STORAGE SYSTEM WITH HEAT EXCHANGE APPARATUS

(75) Inventor: Richard O. Rhodes, San Francisco, CA (US)

(73) Assignee: Fafco, Incorporated, Chico, CA (US)

( * ) Notice: Subject to any disclaimer, the term of this patent is extended or adjusted under 35 U.S.C. 154(b) by 18 days.

(21) Appl. No.: 10/001,224

(22) Filed: Nov. 30, 2001

(65) Prior Publication Data

US 2003/0101988 A1 Jun. 5, 2003

(51) Int. Cl.[7] .................................................. F24J 2/24
(52) U.S. Cl. ...................... 126/655; 126/675; 126/663; 126/709; 126/704
(58) Field of Search ................................ 126/655, 675, 126/709, 704, 705, 706, 707, 708, 711, 652, 640, 648, 663

(56) References Cited

U.S. PATENT DOCUMENTS

| | | | | |
|---|---|---|---|---|
| 4,116,225 A | * | 9/1978 | Ortabasi | 126/643 |
| 4,205,662 A | * | 6/1980 | Rhodes et al. | 126/672 |
| 4,228,789 A | * | 10/1980 | Kay | 126/686 |
| 4,341,200 A | * | 7/1982 | Bowen | 126/704 |
| 4,378,789 A | * | 4/1983 | Vironneau | 126/654 |
| 4,404,962 A | * | 9/1983 | Zinn et al. | 126/676 |
| 4,426,999 A | * | 1/1984 | Evans et al. | 126/669 |
| 4,473,066 A | * | 9/1984 | Clark | 126/675 |
| 4,481,975 A | * | 11/1984 | Buckley | 137/561 A |
| 4,517,961 A | * | 5/1985 | Bloor et al. | 126/622 |
| 4,531,511 A | * | 7/1985 | Hochberg | 126/706 |
| 4,535,756 A | * | 8/1985 | Rinehart et al. | 126/710 |
| 4,928,665 A | * | 5/1990 | Klier et al. | 126/567 |
| 5,572,988 A | * | 11/1996 | Walton | 126/652 |
| 5,596,981 A | * | 1/1997 | Soucy | 126/704 |

* cited by examiner

*Primary Examiner*—Henry Bennett
*Assistant Examiner*—Kathryn Odland
(74) *Attorney, Agent, or Firm*—Beyer Weaver & Thomas, LLP

(57) ABSTRACT

The present invention relates to an integral solar energy collector storage systems. Generally, an integral collector storage system includes a tank system, a plurality of heat exchange tubes with at least some of the heat exchange tubes arranged within the tank system, a first glazing layer positioned over the tank system and a base plate positioned under the tank system. In one aspect of the invention, the tank system, the first glazing layer an the base plate each include protrusions and a clip is provided to hold the layers together. In another aspect of the invention, the first glazing layer and the base plate are ribbed to provide structural support. This arrangement is particularly useful when these components are formed from plastic. In yet another aspect of the invention, the tank system has a plurality of interconnected tank chambers formed from tubes. In this aspect, a supply header pipe and a fluid return header pipe are provided at a first end of the tank system. The heat exchange tubes have inlets coupled to the supply header pipe and outlets coupled to the return header pipe. With this arrangement, the heat exchange tubes may be inserted into the tank chambers from the first end of the tank system.

42 Claims, 12 Drawing Sheets

INTEGRAL COLLECTOR STORAGE SYSTEM WITH HEAT EXCHANGE APPARATUS

STATEMENT REGARDING FEDERALLY SPONSORED RESEARCH OR DEVELOPMENT

This application was made in part with government support awarded by the National Renewable Energy Laboratories which is a Division of the Department of Energy under prime contract number DE-AC36-99GO10337 and subcontract number NAA-2-32463-01. The government has certain rights in the invention.

BACKGROUND OF THE INVENTION

1. Field of Invention

The present invention relates generally to integral collector storage systems. More particularly, the present invention relates to an efficient integral collector storage system which may be readily assembled and disassembled.

2. Description of the Related Art

As the efficient use of energy becomes more of a concern, the use of solar energy in conjunction with heating systems is becoming increasingly prevalent. Heating systems which use solar energy are typically arranged to capture solar heat, and to store the solar heat until the heat is needed. In one common solar energy storage systems, solar heat is "stored" by warming a fluid such as water and storing the heated or warmed fluid/water. In many applications, the heated water is stored separately from the panel that collects the solar heat. However, in some systems, typically referred to as integral collector storage systems, the collector panel has internal storage tanks that store the heated water as well. Some integral collector storage systems are arranged to warm water, then to use the warmed water directly, e.g., without further warming. Other integral collector storage systems may initially warm water, then provide the warmed water to another device which further warms the water.

Often, an integral collector storage system is used as a "pre-heater" in a heating system, e.g., a water heating system wherein a solar based integral collector storage system feeds a water heater. Preheating tends to increase the efficiency of the water heater. FIG. 1 is a diagrammatic representation of a system which uses a preheater collector. A system 100 includes a cold water supply 104 which may be fed to a collector 106, e.g., a solar collector, which is exposed to solar energy, or sunlight. Heat is effectively transferred to the water, while circulating within collector 106.

When water passes out of collector 106, water may be provided to a water heater 110 through an inlet 114 to water heater 110. As will be appreciated by those skilled in the art, water heater 110 is generally used to further heat the water, when necessary, and to provide the heated water for use, e.g., to a house. Water heater 110 may provide heated water, for example, through an outlet 118 that is connected to a plumbing system for a house.

Integral collector systems are typically effective to warm a fluid such as water that passes through the integral collector system. However, the cost associated with integral collector systems is often high. Specifically, mechanisms such as screws and bolts are generally used in the assembly of integral collector systems. As such, the assembly process for initially assembling an integral collector system is often time consuming and, hence, expensive. Further, when maintenance is to be performed on the integral collector system, the various screws and bolts used in the assembly of the integral collector system must be removed and, eventually, reinstalled after maintenance is completed. Like the initial assembly of an integral collector system, both the disassembly and the reassembly of such a system may be time-consuming and relatively expensive.

SUMMARY OF THE INVENTION

The present invention relates to an integral solar energy collector storage systems. Generally, an integral collector storage system in accordance with the present invention includes a tank system, a first glazing layer positioned over the tank system and a base plate positioned under the tank system. In some embodiments, one or more heat exchange tubes are arranged within the tank system.

In one aspect of the invention, the tank system, the first glazing layer and the base plate each include protrusions and a clip is provided to hold the layers together. In some embodiments, the protrusions on the first glazing layer and the base plate are substantially L-shaped and the clip includes a U-shaped that slides over distal ends of the L-shaped protrusions and a top cap that snaps over a base portion of one of the protrusions.

In another aspect of the invention, the first glazing layer and the base plate are ribbed to provide structural support. This arrangement is particularly useful when these components are formed from plastic.

In yet another aspect of the invention, the tank system has a plurality of interconnected tank chambers formed from tubes. In this aspect, a supply header pipe and a fluid return header pipe are provided at a first end of the tank system. The heat exchange tubes have inlets coupled to the supply header pipe and outlets coupled to the return header pipe. With this arrangement, the heat exchange tubes may be inserted into the tank chambers from the first end of the tank system.

In various embodiments, a variety of other components may be provided as well. For example, an insulating pad may be positioned between the base layer and the tank system. A second glazing layer may be positioned between the tank system and the first glazing layer.

In a method aspect, an integral collector storage system is assembled by stacking the first glazing layer, the tank system having the heat exchangers inserted therein and the base plate. A clip is then inserted over protrusions extending from at least the glazing layer and the base plate to hold the collector storage system together.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2(*b*) is a diagrammatic perspective representation of an integral collector system in accordance with an alternative embodiment of the present invention.

FIG. 4(*b*) is a diagrammatic perspective view of an alternative internal glazing layer that is particularly well adapted for use with system illustrated in FIG. 2(*b*).

FIG. 7(*b*) is a diagrammatic perspective view of an alternative base plate that is particularly well adapted for use with system illustrated in FIG. 2(*b*).

DETAILED DESCRIPTION OF THE EMBODIMENTS

Figure 1:
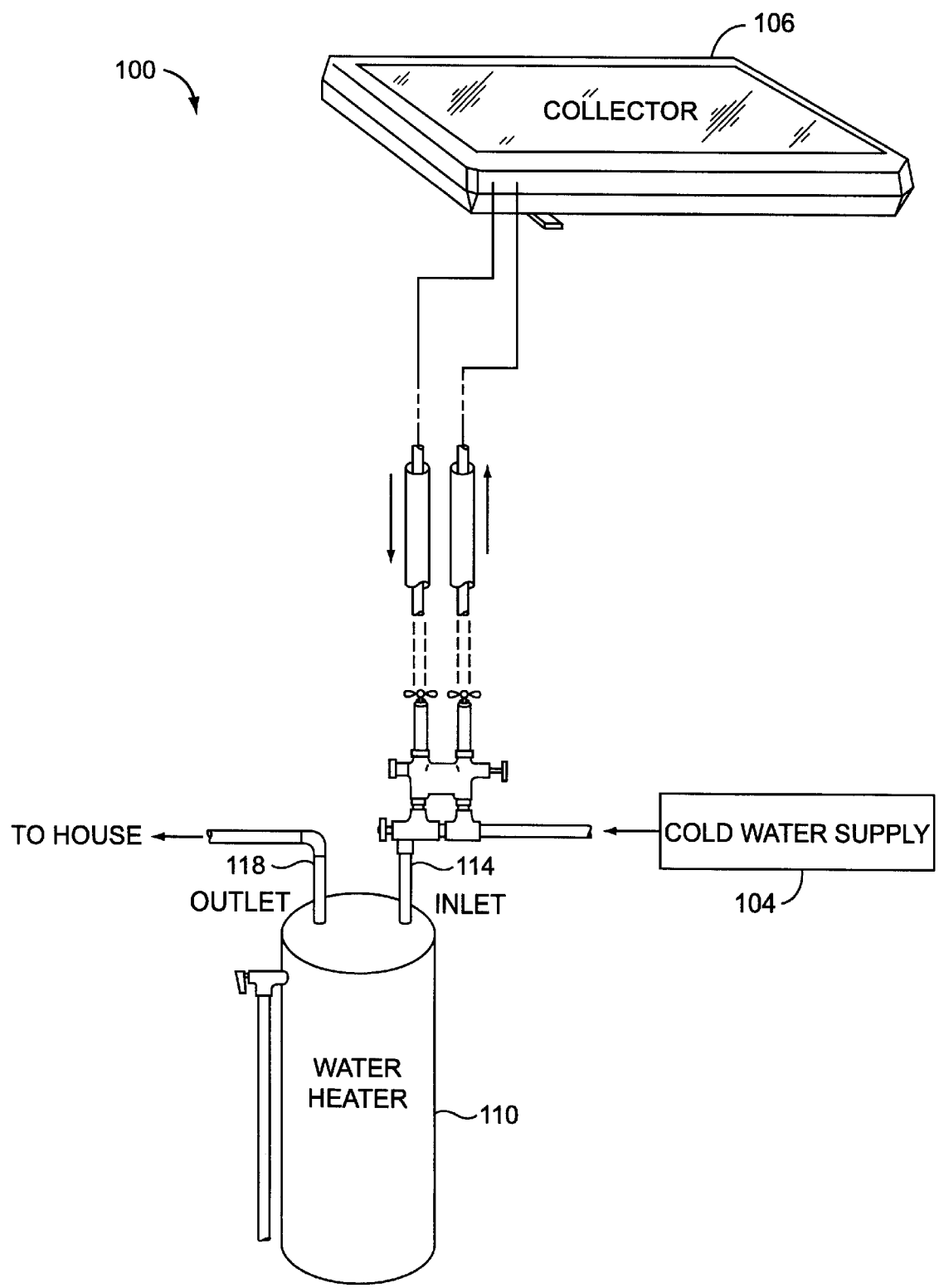
FIG. 1 is a diagrammatic representation of a heating system which includes a heater and a preheater.

Integral collector storage systems, are typically effective to at least partially heat a fluid before the fluid is used or further heated. While integral collector systems may be effective, they tend to be relatively expensive, due in part to the relatively high costs of their manufacture and assembly. Generally, an integral collector storage system includes a tank system, a first glazing layer positioned over the tank system and a base plate positioned under the tank system. The present invention seeks to provide an improved, generally reasonably priced integral collector storage system with a plurality of heat exchange tubes having at least some of the heat exchange tubes arranged within the tank system. Several manufacturing and assembly improvements are described and generally, the improvements may be used either together or individually.

In the illustrated embodiments, one or more clips are snapped onto the integral collector storage system to hold the assembly together. Any suitable number of clips may be provided. In some embodiments, one clip is provided along each edge of the assembly. In other embodiments, multiple clips are utilized along at least some of the sides of the assembly. It should be appreciated that the actual number of clips used can be widely varied and that in some implementations, even a single clip that extends all around the collector storage system can work well. The clip(s) hold the assembly together and seal the assembly from rain and prevents heat loss while allowing some movement of the various parts caused by thermal expansion. The clip(s) can also be extended and used to anchor the collector to the mounting surface.

FIG. 2(*a*) is a diagrammatic perspective representation of an integral collector system in accordance with an embodiment of the present invention. An integral collector storage system 160 includes an external glazing layer 164 and a base layer 212 which are substantially held together by one or more locking clips 214. Clips 214 are arranged to facilitate the assembly and disassembly of integral collector storage system 160, for example, when maintenance is to be performed on the components of integral collector storage system 160, which will be discussed below with respect to FIG. 3. External glazing layer 164, which may be formed from a substantially clear plastic material, includes ribs 170 which enable external glazing layer to be substantially spaced apart from internal components of integral collector storage system 160. The ribs also improve the structural strength of the layer and the whole assembly. Also included in external glazing layer 164 are panels 174 which are separated by ribs 170.

Integral collector storage system 160 includes at least one opening 180 through which a heat exchange fluid, e.g., water, that is to be preheated may enter integral collector storage system 160. Once the heat exchange fluid is preheated, the heat exchange fluid may exit integral collector storage system 160 though an exit opening (not shown) and be piped into, for instance, a water heater.

In general, integral collector storage system 160 may be placed on an even surface to gather solar energy. Specifically, integral collector storage system 160 may be placed on a rooftop and oriented such that external glazing layer 164 may be substantially directly exposed to solar energy. Hence, in one embodiment, the size of integral collector storage system 160 may be constrained to enable integral collector storage system to be readily fit on a rooftop. For example, integral collector storage system may be approximately four feet in width, approximately ten feet in length, and approximately 4–6 inches in thickness.

In the embodiment illustrated in FIG. 2(*a*), the ribs 170 are arranged to extend longitudinally in parallel to one another. However, it should be appreciated that the geometry of the ribs may be widely varied. By way of example chevron shaped ribs may be used. FIG. 2(*b*) illustrates an alternative integral collector storage system 160' including external glazing layer 164', chevron shaped ribs 170', base layer 212' and clips 214'. The chevron shaped ribs 170' of FIG. 2(*b*) tend to provide even greater structural rigidity than the longitudinally extending ribs of FIG. 2(*a*).

Figure 2A:
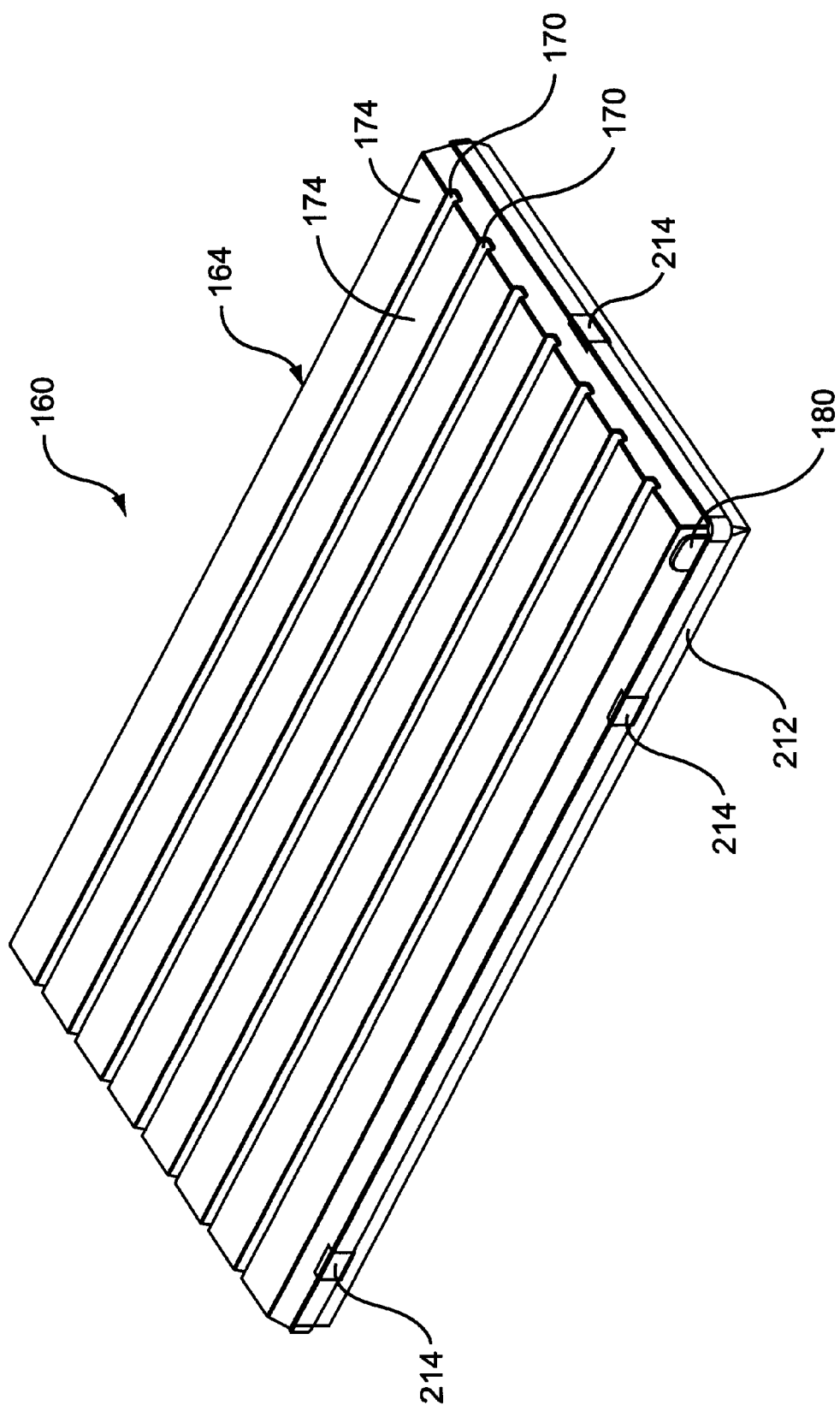
FIG. 2(*a*) is a diagrammatic perspective representation of an integral collector system in accordance with an embodiment of the present invention.
Figure 2B:
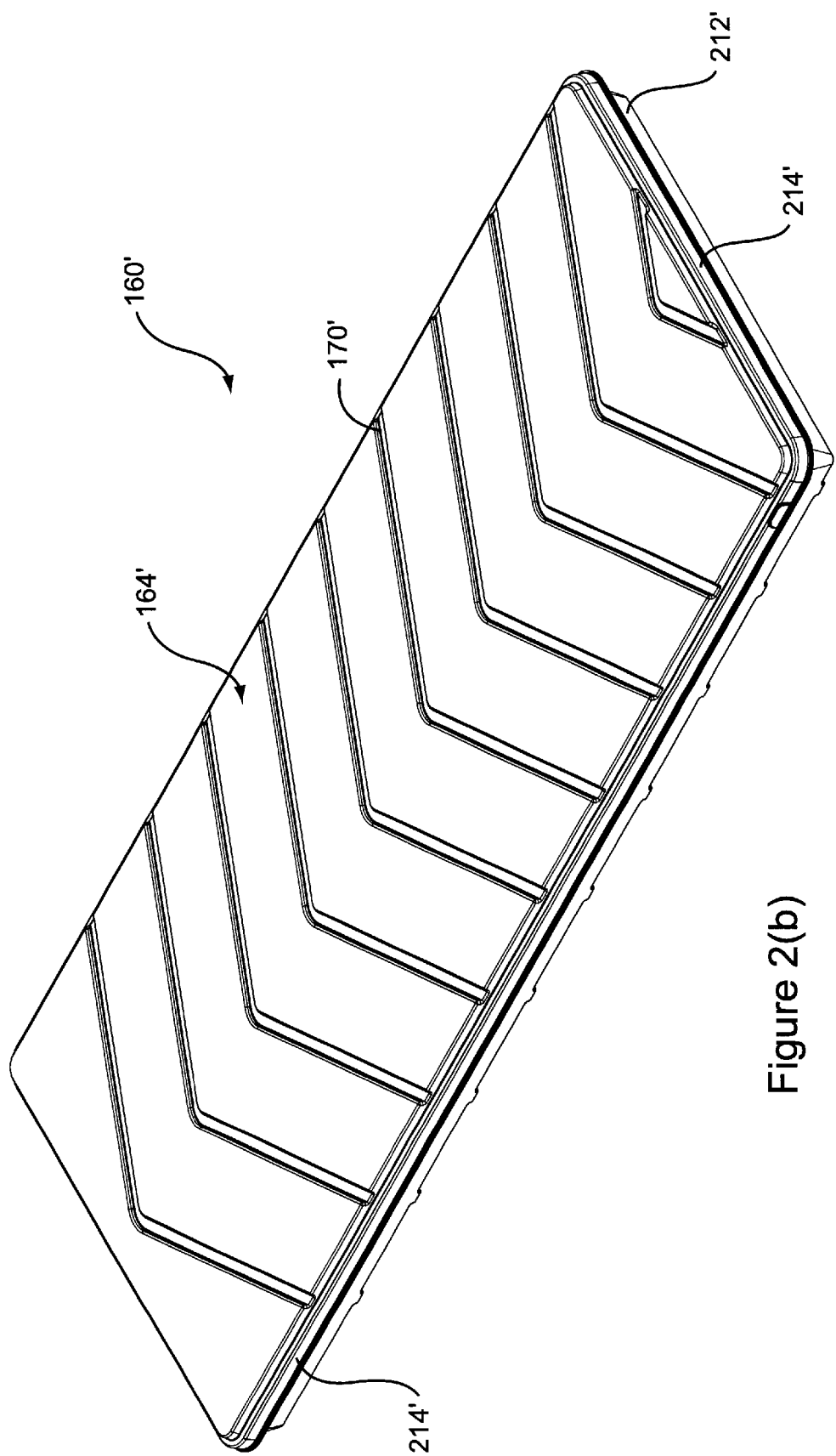
Figure 3:
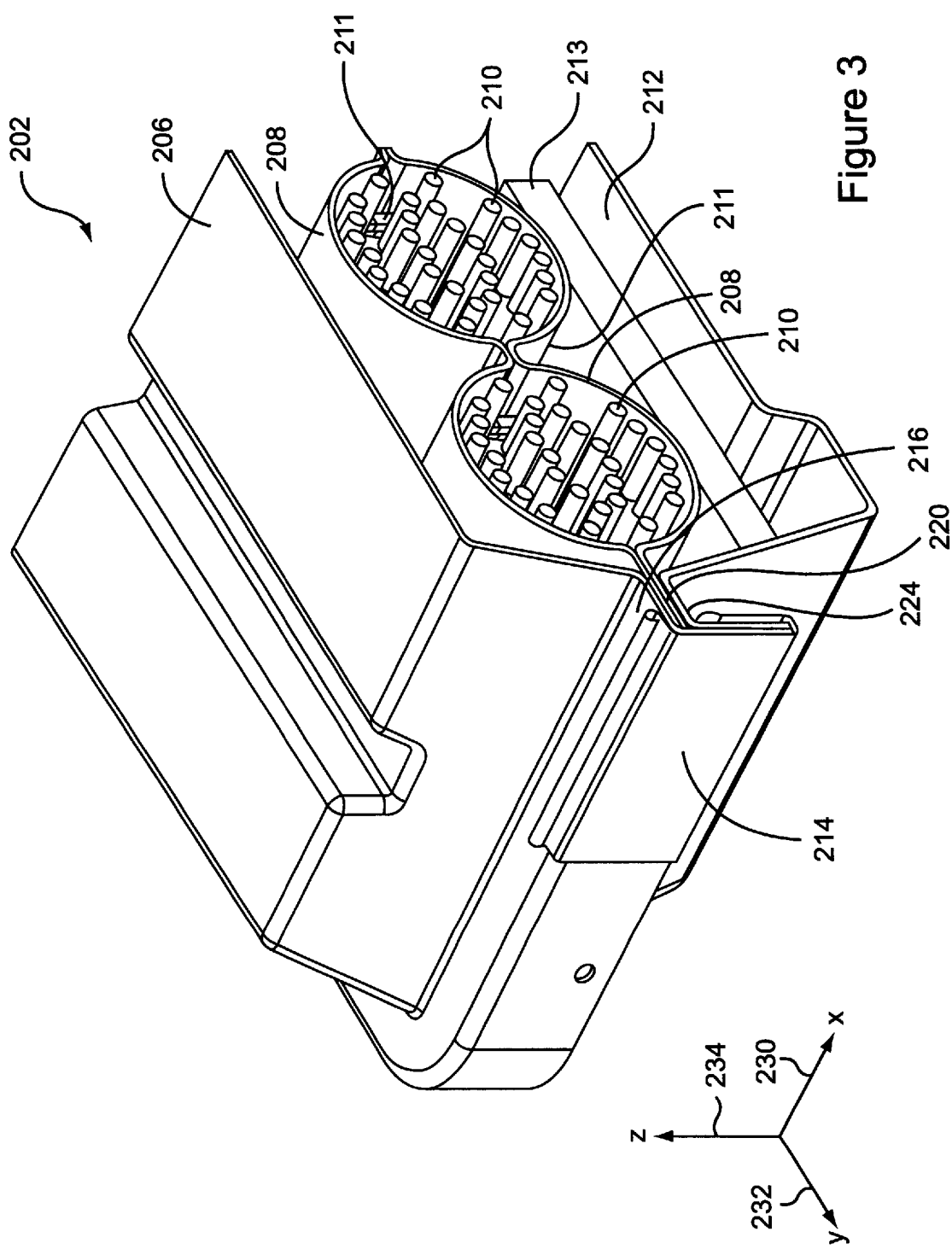
FIG. 3 is a diagrammatic cut-away perspective representation of a section of an integral collector storage system, e.g., integral collector storage system 160 of FIG. 2(*a*), in accordance with an embodiment of the present invention.

Referring next to FIG. 3, the components of one example of an integral collector storage system will be described. FIG. 3 is a diagrammatic cut-away representation of a section of an integral collector storage system, e.g., integral collector storage system 160 of FIG. 2(*a*), in accordance with an embodiment of the present invention. A section 202 of an integral collector includes an "inner" glazing layer 206, which is arranged to cooperate with an "outer" glazing layer (not shown), such as glazing layer 164 of FIG. 2(*a*), to allow the influx of solar energy into the integral collector storage system. The use of both an inner glazing layer 206 and an outer glazing layer breaks up convection units associated with the solar energy, as will be understood by those skilled in the art.

In one embodiment, inner glazing layer 206 includes ribs which either contact holding tanks 208 or an upper glazing layer in order to maintain separation between portions of inner glazing layer 206, holding tanks 208, and the upper glazing layer, as will be discussed below with respect to FIG. 4. Alternatively, in lieu of ribs which space inner glazing layer 206 apart from holding tanks 208 and an upper glazing layer, dimples or similar structures may be formed in inner glazing layer 206. In one embodiment, instead of using dimples or ribs, dowels or other substantially separate structures may be placed between internal glazing layer 206 and holding tanks 208, as well as an upper glazing layer, to maintain separations between internal glazing layer 206 and holding tanks, as well as internal glazing layer 206 and the upper glazing layer. Generally, inner glazing layer 206 may be formed from a material such as plastic, e.g., a substantially clear plastic, using substantially any suitable method. The methods include, but are not limited to, thin-walled pressure forming, vacuum forming and welding.

Holding tanks 208, which may be filled with a heat transfer fluid such as water, contain a plurality of heat exchange tubes 210. Holding tanks 208 may be formed from a plastic material, e.g., a dark plastic material, and may be arranged in a parallel orientation such that holding tanks 208 are aligned in a plane, as will be described below with reference to FIG. 5. Heat exchange tubes 210 may be coupled at both ends to header pipes, as will be discussed below with respect to FIG. 6, such that the header pipes effectively hold heat exchange tubes 210 within holding tanks 208. Within holding tanks 208, heat exchange tubes 210 may be held by grids 211 which space individual heat exchange tubes 210 apart. Although heat exchange tubes 210 may be made from substantially any suitable material, in one embodiment, heat exchange tubes 210 are formed from a thermoplastic material.

As will be appreciated by those skilled in the art, a heat exchange fluid such as water may be preheated for use by a water heater when the heat exchange fluid is either circulated through or held within heat exchange tubes 210. In general, heat that is transferred through inner glazing layer 206 to holding tanks 208 is then transferred from holding tanks 208 to the heat exchange fluid, e.g., water, that is held in holding tanks 208. The heat exchange fluid held in holding tanks 208 exchanges heat with the heat exchange fluid held by heat exchange tubes 210 through the walls of heat exchange tubes 210. It should be understood that although the heat exchange fluid held in holding tanks 208 may be the same as the heat exchange fluid held in heat exchange tubes 210, the heat exchange fluids may be different.

Holding tanks 208 are arranged to rest upon an insulation pad 213 which rests atop a base layer 212. Insulation pad 213, which may be formed from an insulating material such as urethane foam, is arranged to substantially resist heat flow from the back of holding tanks 208. Although the thickness of insulation layer 213 may vary depending upon the requirements of the overall system, the thickness of insulation pad 213 is typically in the range of approximately one inch to approximately 1.5 inches. In some embodiments, a thin metal layer (such as aluminum) may be adhered to the insulating pad in order to provide additional mechanical support for the integral collector.

Base layer 212, which may be formed from a dark plastic material, is arranged to support an integral collector on a surface, e.g., a roof. Base layer 212 will be described below with reference to FIG. 7.

Figure 8:
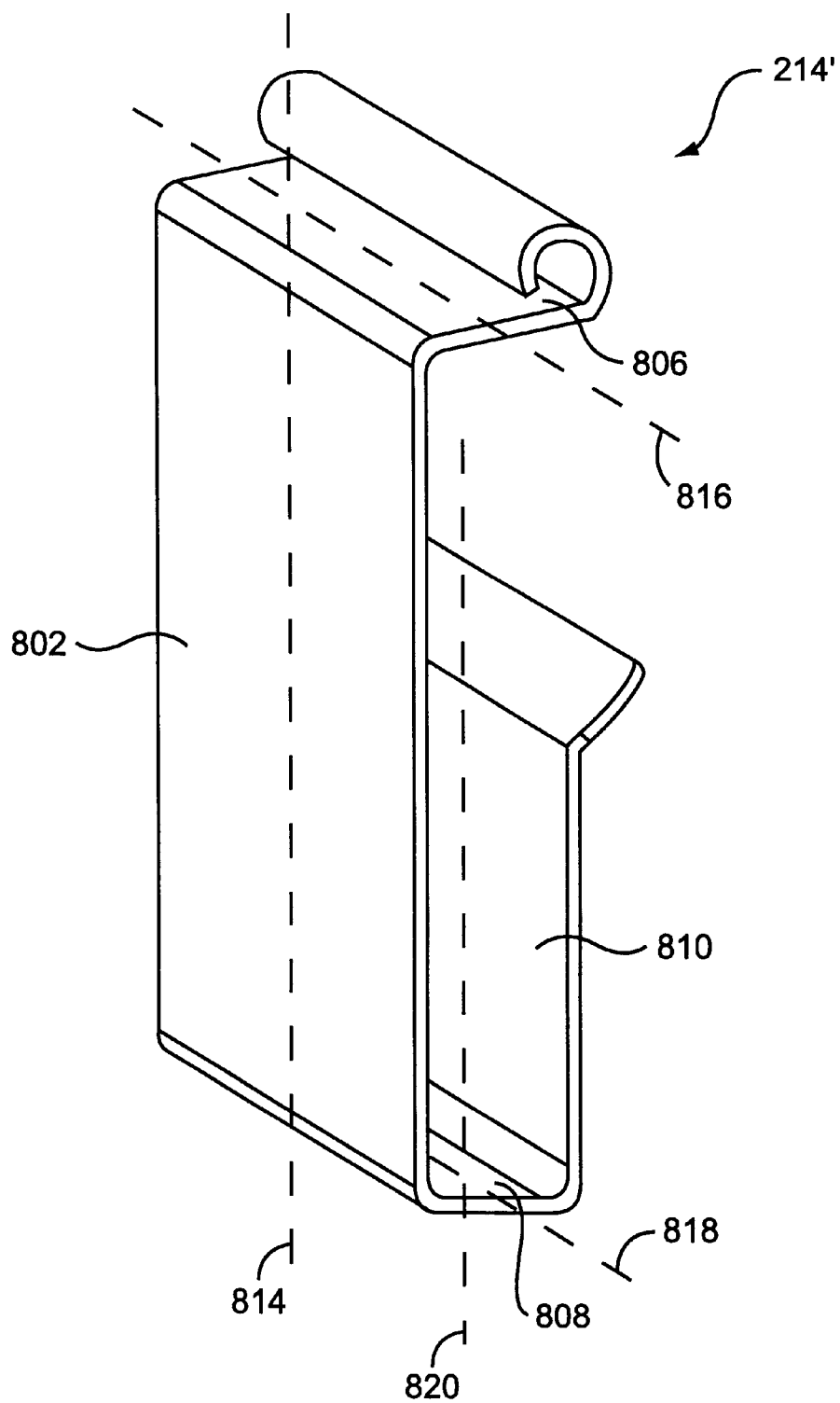
FIG. 8 is a diagrammatic representation of a clip, e.g., a scaled down version of clip 214 of FIG. 2(*a*), which is arranged to lock together components of an integral collector storage system in accordance with an embodiment of the present invention.

In order to hold the integral collector, e.g., integral collector 160 of FIG. 2(a), together as a unit, a clip 214 may be used to effectively secure an external glazing layer. Clip 214, which will be described below with respect to FIG. 8, is arranged to facilitate the assembly and the disassembly of integral collector 160 of FIG. 2(a). Unlike the use of screws and bolts which require substantial work to remove and tighten, clip 214 may be substantially slid over protrusions 216, 220, and 224, in addition to a corresponding protrusion from an external glazing layer (not shown), then snapped into place. For example, as shown, clip 214 may be slid over protrusion 224 of base layer 212 and protrusion 216 of internal glazing layer 206, as well as the protrusion of an external glazing layer, then snapped into place such that protrusions 224 and 216, as well as protrusions 220 of holding tanks 208 and the protrusion of the external glazing layer, are held substantially immovably with respect to one another. In other words, when snapped or locked into place, clip 214 prevents internal glazing layer 206, holding tanks 208, and base layer 212 from significantly sliding or moving with respect to each other.

When snapped into place, clip 214 may be caused to slide along an x-direction 230, e.g., by a person who is assembling or disassembling the overall integral collector. In order to remove clip 214 to disassemble the overall integral collector, a top portion of clip 214 may effectively be forcibly slid along protrusion 216 in a y-direction 232. Once the top portion of clip 214 is slid such that clip 214 is no longer snapped in place with respect to protrusions 224, 216, and 220, then clip 214 may be removed from the integral collector in a z-direction 234, e.g., a "negative" z-direction.

Figure 4A:
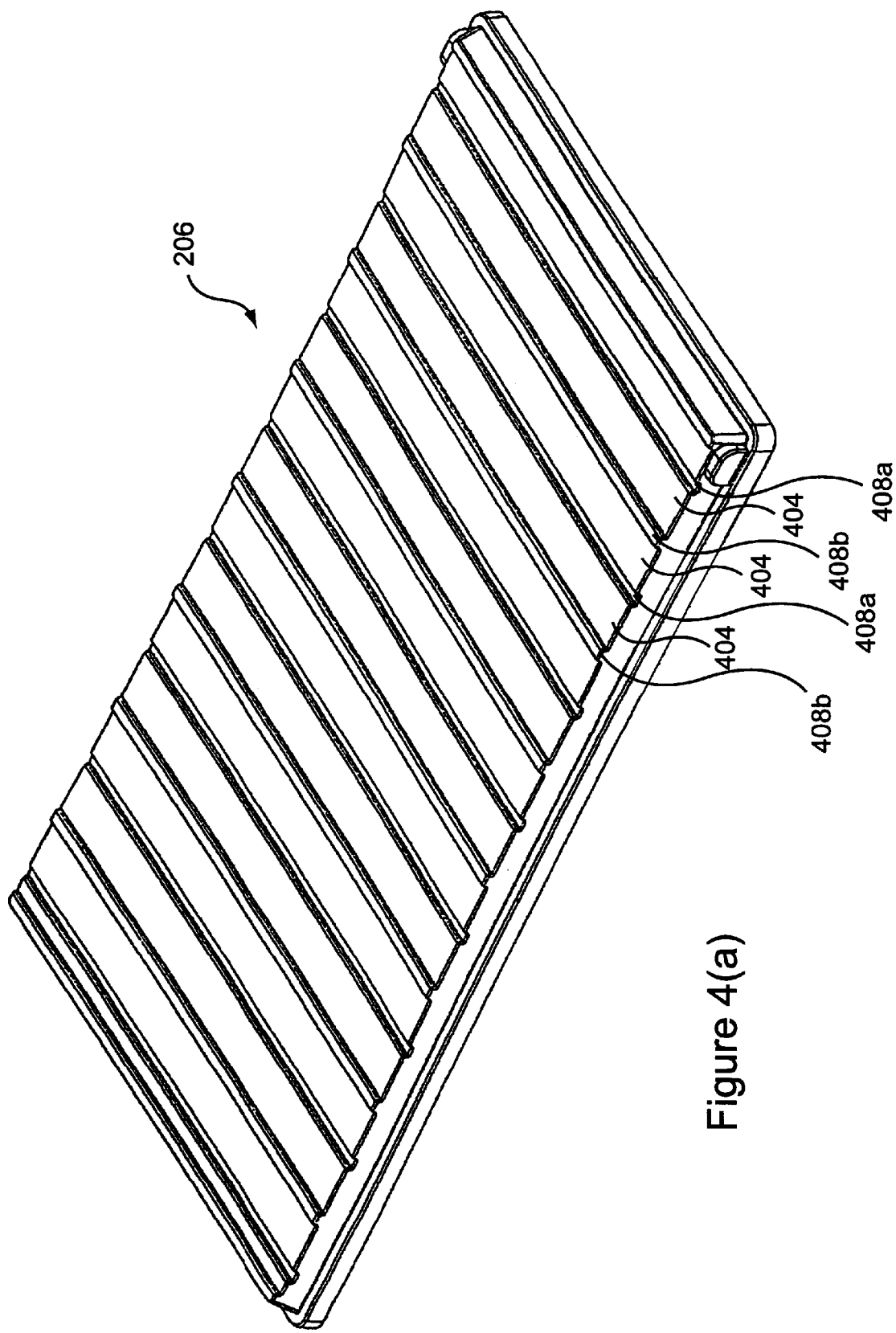
FIG. 4(*a*) is a diagrammatic perspective representation of an internal glazing layer, e.g., internal glazing layer 206 of FIG. 3, in accordance with an embodiment of the present invention.

As previously mentioned, both an external glazing layer and an internal glazing layer of an integral collector include ribs which are arranged to enable the glazing layers to be spaced apart from each other, as well as from other components of the integral collector. FIG. 4(a) is a diagrammatic representation of an internal glazing layer, e.g., internal glazing layer 206 of FIG. 3, in accordance with an embodiment of the present invention. Internal glazing layer 206 includes panels 404 which are separated by ribs 408. Some ribs 408 are arranged to separate panels 404 from an external glazing layer that is positioned over internal glazing layer 206, while other ribs 408 are arranged to separate panels 404 from holding tanks which may be located beneath internal glazing layer 206. Every other rib 408 is arranged to have substantially the same configuration. That is, ribs 408a extend below panels 404 to support panels 404 over holding tanks, while ribs 408b extend above panels 404 to support panels 404 beneath an external glazing layer.

In the described embodiment, ribs 408 and panels 404 of internal glazing layer 206 are substantially perpendicularly aligned with ribs and panels of an external glazing layer which is mounted above internal glazing layer 206. It should be appreciated that ribs 408b are arranged to come into contact with ribs 170 of external glazing layer 164 of FIG. 2(a) to maintain a separation between panels 404 and panels 174. Although the separation that is maintained may vary widely, the actual separation is typically chosen to allow convection units to be broken up to achieve an efficient influx of solar energy to holding tanks positioned beneath internal glazing layer 206. Areas of direct contact between the top and inner glazing layers as well as between the inner glazing layer and the holding tank are minimized to restrict heat loss in these areas.

Figure 4B:
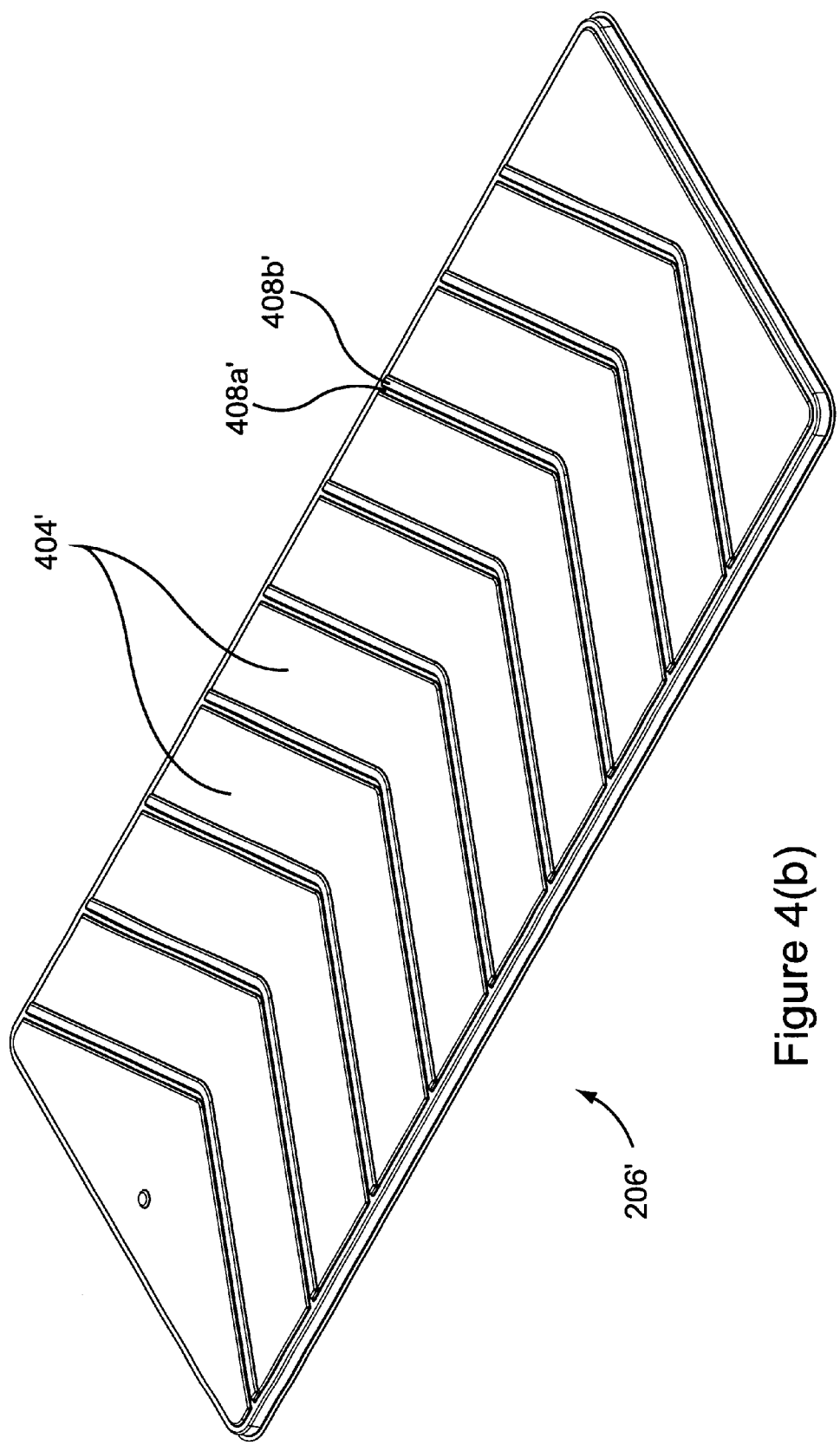

FIG. 4(b) illustrates an alternative internal glazing layer 206' that is particularly well adapted for use with the external glazing layer 164' illustrated in FIG. 2(b). This embodiment, includes panels 404' and chevron shaped ribs 408' that are inverted relative to the chevron shaped ribs 170' in the external glazing layer 164'. Alternating ribs 408a' and 408b' may be provided in the same manner as suggested above with respect to FIG. 4(a).

Figure 5:
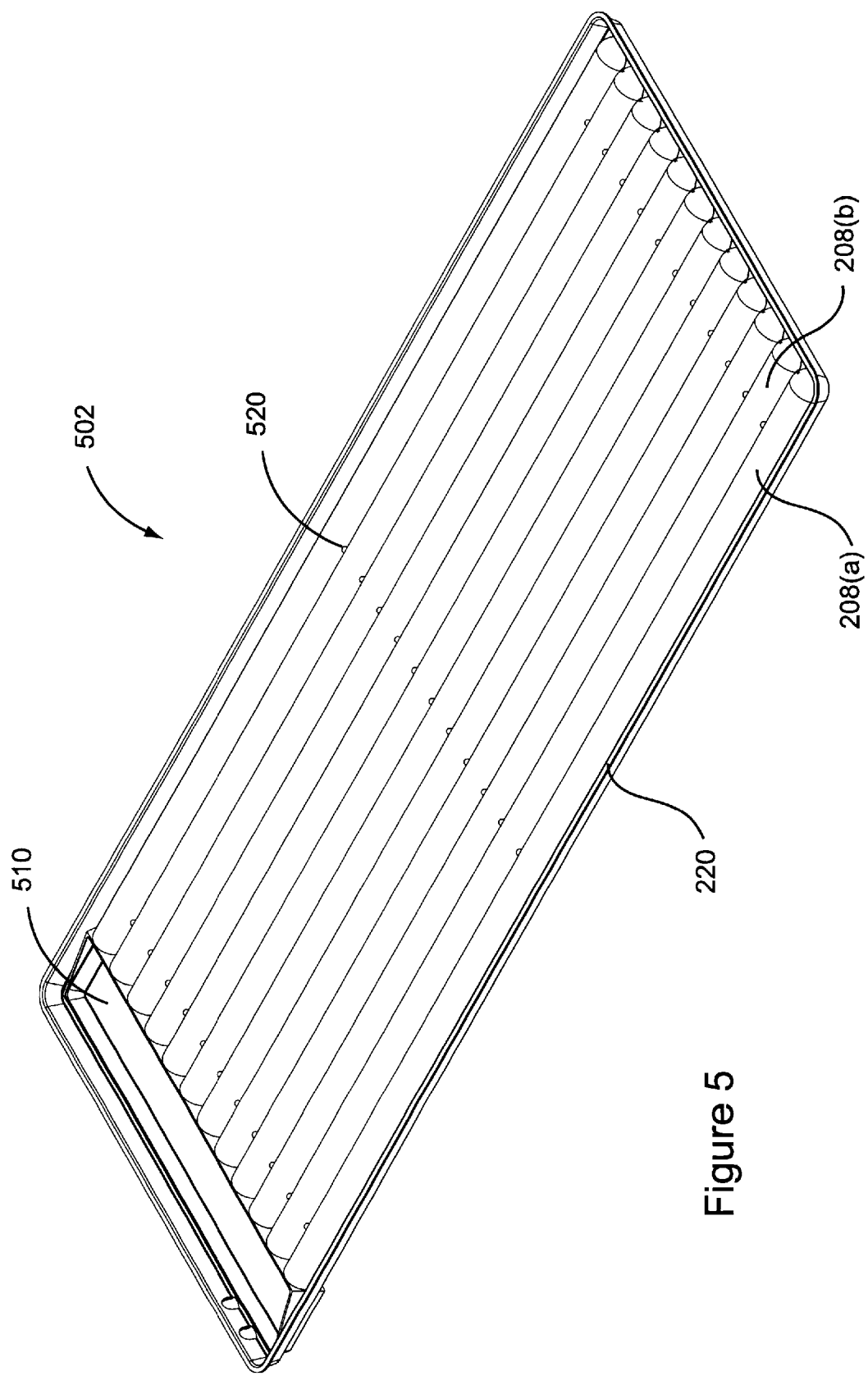
FIG. 5 is a diagrammatic perspective representation of holding tanks, e.g., holding tanks 208 of FIG. 3, that are suitable for use in an integral collector storage system in accordance with an embodiment of the present invention.

FIG. 5 is a diagrammatic perspective representation of holding tanks, e.g., holding tanks 208 of FIG. 3, that are suitable for use in an integral collector storage system in accordance with an embodiment of the present invention. In the illustrated embodiment, the holding tanks 208 are generally interconnected. That is, holding tank 208a is in fluid communication with holding tanks 208b to facilitate such things as uniform filling, replacement of evaporated water and draining. The positioning and the number of the interconnects may be widely varied. In some embodiments, a single interconnect may be provided between adjacent tanks. In other embodiments there may be multiple interconnects between adjacent holding tanks (e.g., with the interconnects being provided near the bottom and near the middle of the tanks). In alternative embodiments, the holding tanks may be independent or only some of the holding tanks 208 may be in fluid communication with one another. In addition, in some systems, only a single holding tank 208 may be part of an overall integral collector storage system.

Holding tanks 208 may be formed, as shown, as a part of a holding tank panel 502 in which individual holding tanks 208 may be substantially spaced apart by spacers (not shown). As best shown in FIG. 3, panel 502 generally includes a top plate 514 and a bottom plate 518, which may be welded together or formed by twin sheet forming. As shown, protrusions 220 that facilitate the locking of clip 214 of FIG. 2(a) to secure glazing layers and holding tanks 208, may be formed on the edges of panel 502.

Panel 502 includes an end portion 510 which accommodates header pipes, as will be discussed below with respect to FIG. 6. The header pipes are generally coupled to heat exchange tubes 210 of FIG. 2(a) to facilitate the flow of a heat exchange fluid from a fluid source, through heat exchange tubes 210, and out to a primary heating device, e.g., a water heater. Typically, header pipes would nest within end portion 510 such that heat exchange tubes 210 of FIG. 2(a) may extend through holding tanks 208.

In the embodiment shown, a row of molded posts 520 are provided along the longitudinal centerline of the holding tank panel 502. The posts engage adjacent layers to provide additional structural rigidity to the collector. In alternative embodiments, the posts 520 may be eliminated, or more or less posts may be provided. The posts 520 may be positioned at an endless variety of locations within the panel holding tank panel 502.

Figure 6:
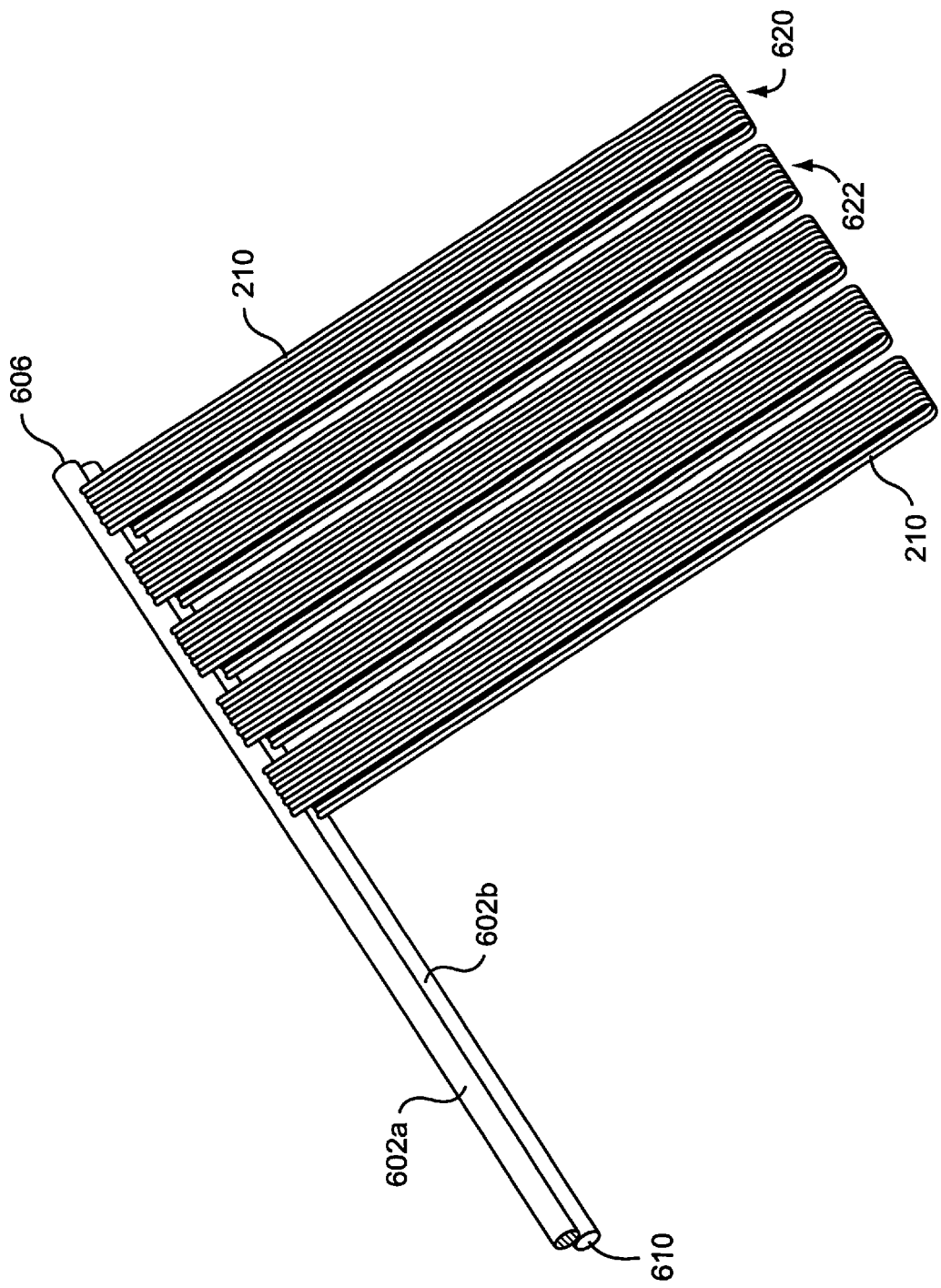
FIG. 6 is a diagrammatic perspective representation of heat exchange tubes, e.g., heat exchange tubes 210 of FIG. 3, and header pipes in accordance with an embodiment of the present invention.

With reference to FIG. 6, heat exchange tubes, e.g., heat exchange tubes 210 of FIG. 2(a), and header pipes will be discussed in accordance with an embodiment of the present invention. Heat exchange tubes 210 may be welded or fused onto header pipes 602 such that both ends of each heat exchange tubes 210 are in fluid communication with header pipes 602 and the tubes are bent 180 at an end opposite the header. One suitable method of coupling the heat exchange tubes 210 to the header pipes 602 is described in U.S. Pat. No. 6,038,768, which is incorporated herein by reference. In the described embodiment, when a heat exchange fluid flows from a fluid supply into an opening, e.g., opening 180 of FIG. 2(a), the heat exchange fluid flows into a first end 606 of header pipe 602a. The heat exchange fluid may then flow through header pipe 602, into heat exchange tubes 210 flowing away from the header pipes to the bend, then returning and then out of heat exchange tubes 210 into header pipe 602b and, eventually, out of header pipe 602b through exit opening 610. As will be appreciated by those skilled in the art, header pipe 602b may be coupled to a pipeline which supplies a heating device.

Groups or sets of heat exchange tubes 210 may be arranged to be substantially submerged from the top of the holding tanks within the fluid contained in holding tanks 208 of FIG. 5. For instance, a first group 620 of heat exchange tubes 210 may be positioned within one holding tank 7208 while a second group 622 of heat exchange tubes 210 may be positioned within another holding tanks 208. It should be understood that the number of heat exchange tubes 210 in a group and the length of the tubes may be widely varied depending upon the particular requirements of an overall integral collector storage system.

The use of heat exchange tubes 210 which are coupled to header pipes 602 enables fluid in heat exchange tubes 210 to be exposed to the heat associated with the fluid in holding tanks 208 of FIG. 5, i.e., fluid that remains in holding tanks 208 and is heated through glazing layers, without requiring that the header pipes 602 and heat exchange tubes be sealed from holding tanks 208. That is, fluid such as hot water contained within holding tanks 208 is readily prevented from leaking out of the holding tank without the need for sealing manifolds. In addition fluid in the holding tank is readily prevented from mixing with fluid which flows through heat exchange tubes 210 and header pipes 602.

In the embodiment illustrated in FIG. 6, the up and down riser portions of the heat exchange tubes 210 are elongated and relatively straight such that they run substantially perpendicular to the longitudinal axis of the holding tank chambers. However, in alternative embodiments, the heat exchange tubes may take the form of extended coils. The coils may take any suitable form including having substantially circular footprints, substantially triangular footprints, etc.

Figure 7A:
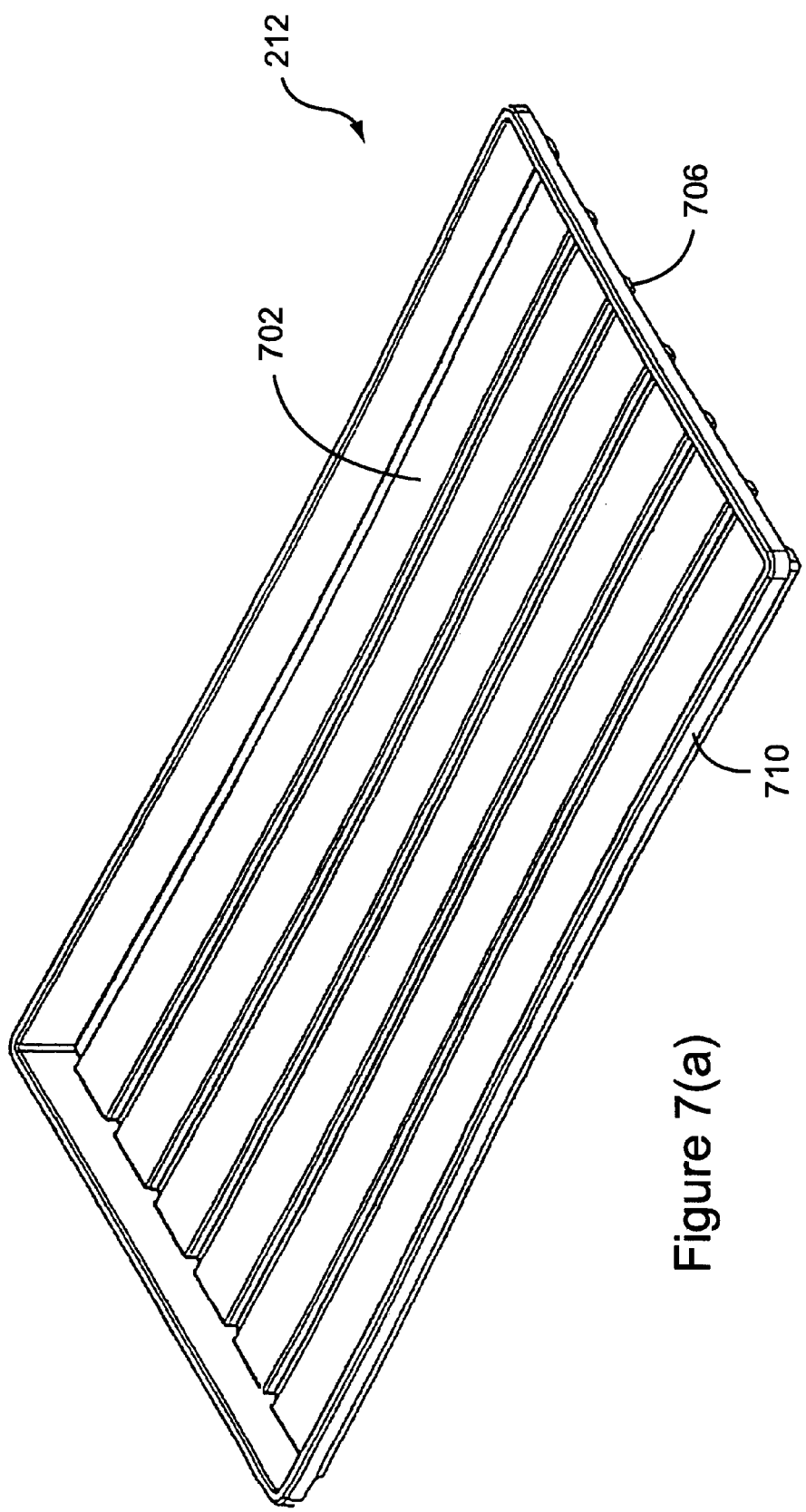
FIG. 7(*a*) is a diagrammatic perspective representation of a base plate, e.g., base plate 212 of FIG. 2(*a*), which is suitable for use as a part of an integral collector storage system in accordance with an embodiment of the present invention.
Figure 7B:
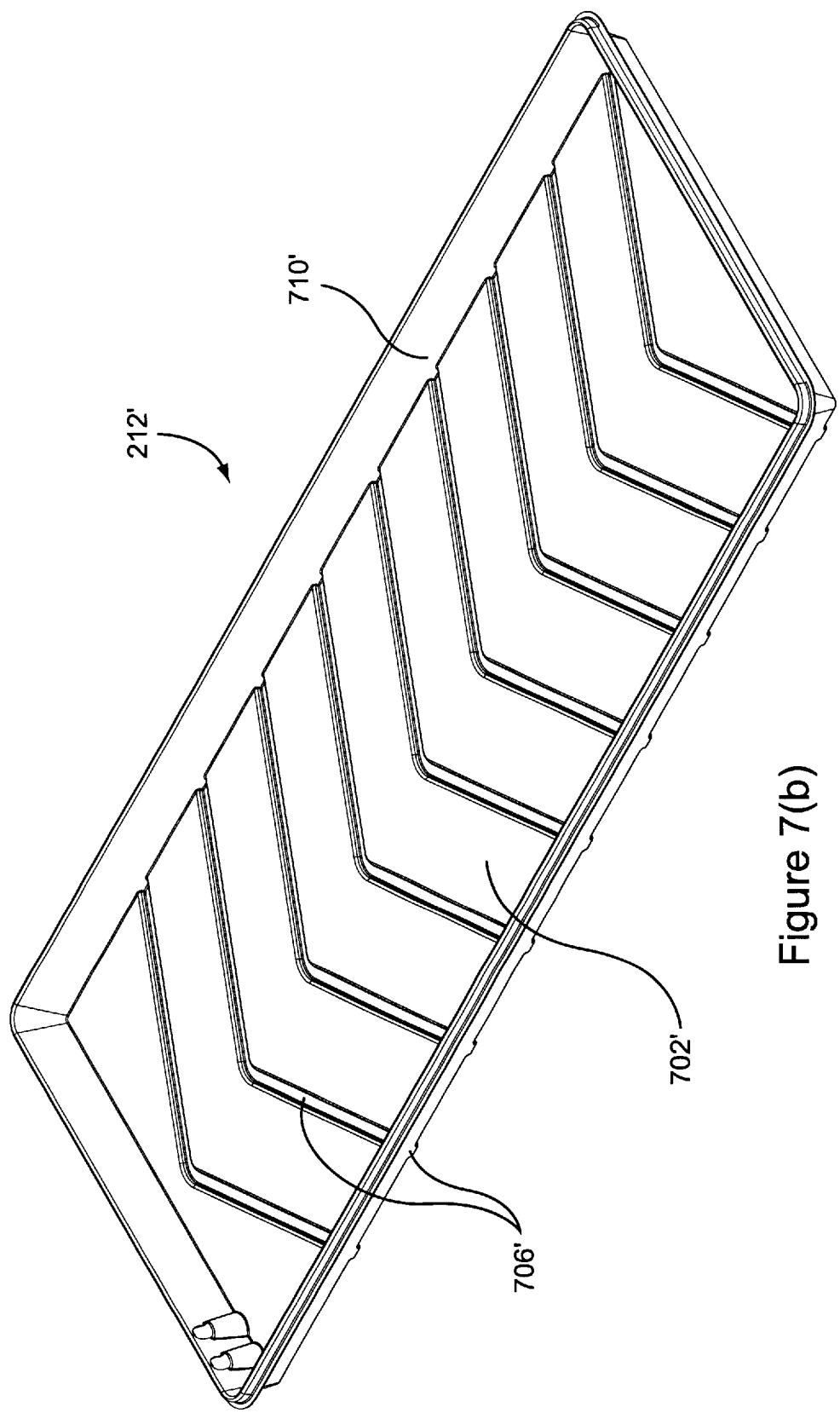

FIG. 7(a) is a diagrammatic perspective representation of a base plate, e.g., base plate 212 of FIG. 2(a), which is suitable for use as a part of an integral collector storage system in accordance with an embodiment of the present invention. Base plate 212 is arranged such that panels 702 of base plate 212 contact an insulation pad on which holding tanks rest. Base plate 212 also includes ribs 706 which are arranged to increase strength and to contact a surface, as for example the surface of a roof and to allow the flow of rain water and air at the roof surface. Protrusions 710 or "lips" on the edges of base plate 212 facilitate the coupling of base plate 212 to other components of an integral collector storage system using a clip. FIG. 7(b) illustrates an alternative base plate structure 212' having panels 702', chevron shaped ribs 706', and protrusion 710'. The chevron shaped ribs 706' are particularly well suited for use in the embodiment illustrated in FIG. 2(b).

Referring next to FIG. 8, a clip 800, e.g., a scaled down version of clip 214 of FIG. 2(a), which is arranged to lock together components of an integral collector storage system will be described in accordance with an embodiment of the present invention. Clip 800, which may be formed from substantially any material which is at least slightly flexible, e.g., plastic, steel or aluminum, includes a body section 802, a top section 806, a bottom section 808, and an extended section 810. Body section 802 includes a body axis 814 and top section includes an axis 816 which is generally in a different plane than body axis 814, but is substantially perpendicularly aligned with body axis 814. Bottom section 808 includes an axis 818 which, in one embodiment, is both parallel to and in substantially the same plane as axis 816. Extended section 810 is substantially parallel to body section 802, and, as a result, includes an axis 820 which is substantially parallel to body axis 814.

When clip 800 is to be slid onto the components of an integral collector storage system, protrusions 216 and 224 of FIG. 2(a), in addition to a protrusion of an external glazing layer, may be positioned between body section 802 and extended section 810. As shown in FIG. 2(a), protrusions 216 and 224 are substantially "L-shaped" such that protrusions 216 and 224 include sections which are parallel to both body section 802 and top section 806, once clip 800 is in place.

After protrusions 216 and 224 are positioned between body 802 and extended section 810, top section 806 may be substantially pushed over a top surface of protrusions 216 and 224. In the described embodiment, top section 806 may be in contact with a top surface of a protrusion of an external glazing layer. That is, when clip 800 is snapped in place, top section 806 generally contacts an external glazing layer. In general, clip 800 is arranged to securely hold components of an integral collector storage system, as previously mentioned. Specifically, clip 800 is arranged to substantially prevent motion of the components relative to one another while clip 800 is engage.

Clip 800 may be of substantially any size. By way of example, clip 800 may be sized such that a single clip is sufficient to clamp an entire side of an integral collector storage system. Alternatively, clip 800 may be sized such that more than one clip may be needed to securely clamp a given side of the integral collector storage system. In one embodiment, a clip 800 may be used on each of four sides of an integral collector storage system to hold the system together. Alternatively, however, a clip 800 may be used on one side, and a similar clip 800 may be used on the opposite side, i.e., two clips 800 may be used, to effectively secure the integral collector storage system.

Figure 9:
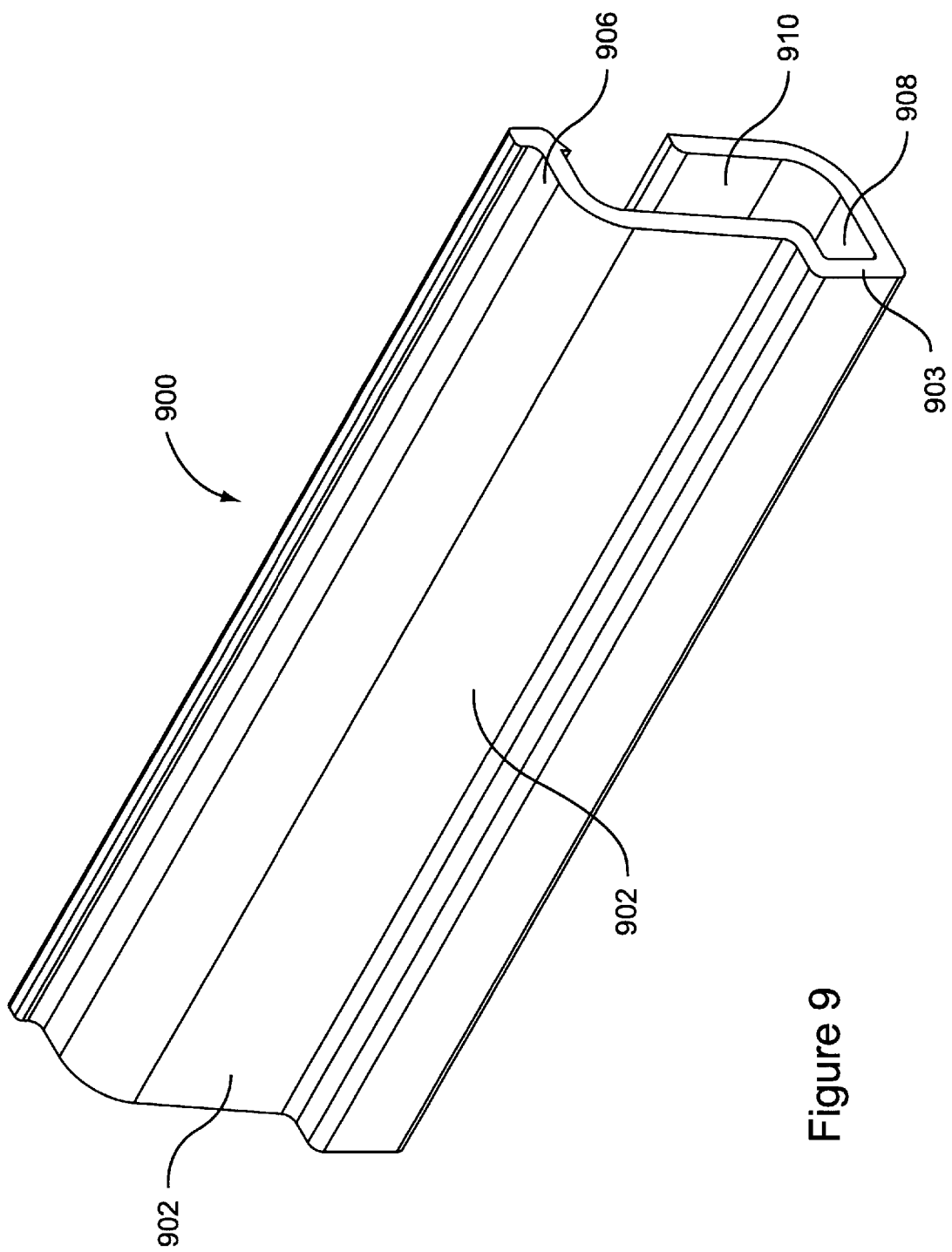
FIG. 9 is a diagrammatic representation of an alternative clip design.

Another alternative clip geometry is illustrated in FIG. 9. In this embodiment the clip 900 has a bottom section 902, top section 906, a bottom section 908 and an extended section 910. The top section 906 has a lip 907 that is arranged to snap fit over the protrusion stack. The body section 902 has a channel 903 formed therein at a lower end adjacent the bottom section 908. The channel 903 provides a bit of extra room that makes it easier to slip the clip 900 over the protrusion stack to hold the integral collector storage system together. Like the previously described clips, the clip 900 may be of any desired length and its geometry may be adjusted to meet the needs of a particular application. The clip 900 may be made of a variety of material, although this design is particularly well adapted for fabrication from plastic materials.

Although only a few embodiments of the present invention have been described, it should be understood that the present invention may be embodied in many other specific forms without departing from the spirit or the scope of the present invention. By way of example, substantially all layers of an integral collector storage system have been described as being held together by a clip. It should be appreciated, however, that not necessarily all layers may be held together by a clip. Holding tanks may be otherwise braced to an insulating pad and an inner glazing layer such that the clip substantially only holds the glazing layers against a base layer to secure the system. Alternatively, an external glazing layer may be placed over an internal glazing layer only after the internal glazing layer is clipped to holding tanks and a base layer, i.e., an external glazing layer may not be clamped with a clip.

Clips have generally been described as replacing screws and bolts in an integral collector storage system. It should be understood, however, that the use of the clips of the present invention is not to be limited to integral collector storage systems or collector systems which do not use screws and bolts. For example, clips may be used in systems which use screws and bolts to further strengthen the clamping forces provided by the screws and bolts. Therefore, the present examples are to be considered as illustrative and not restrictive, and the invention is not to be limited to the details given herein, but may be modified within the scope of the appended claims.

What is claimed is:

1. An integral collector storage system comprising:
   a tank system, the tank system including a plurality of interconnected tank chambers formed from chamber tubes and a first protrusion;
   a plurality of heat exchange tubes arranged to contain a working fluid medium that is to be used outside of the integral collector system, wherein at least some of the plurality of heat exchange tubes are arranged within the tank chambers;
   a first glazing layer positioned over the tank system, the structure of the tank system being independent of the first glazing layer, the first glazing layer including a second protrusion;
   a base plate positioned under the tank system, the structure of the tank system being independent of the base plate, the base plate including a third protrusion, wherein at least a portion of the second and third protrusions sandwich the first protrusion to help hold the tank system in place; and
   a clip arranged to be snapped over at least the second and third protrusions to hold the integral collector storage system together.

2. An integral collector storage system as recited in claim 1 wherein the first glazing layer and the base plate are ribbed.

3. An integral collector storage system as recited in claim 1 wherein the chamber tubes extend between a first and second end of the tank system, the second end being opposite the first end, the integral collector storage system further comprising:
   a supply header pipe and a fluid return header pipe located on the first end of the tank system; and
   wherein the plurality of heat exchange tubes have inlets coupled to the supply header pipe and outlets coupled to the return header pipe, the heat exchange tubes being inserted into the tank chambers from the first end of the tank system.

4. An integral collector storage system as recited in claim 1 wherein the first glazing layer, the tank system and the heat exchangers are all formed from plastic materials.

5. An integral collector storage system as recited in claim 1 further comprising an insulating pad positioned between the base plate and the tank system.

6. An integral collector storage system as recited in claim 1 further comprising a second glazing layer, the second glazing layer being positioned between the tank system and the first glazing layer, the second glazing layer including a fourth protrusion interposed at least in part between the second and third protrusions.

7. An integral collector storage system according to claim 1 wherein:
   the second and third protrusions include respective first sections that extend substantially parallel to a corresponding portion of the first protrusion and second sections that are angled relative to the first sections; and
   the clip has a U-shaped section that is arranged to slide over the second sections of the second and third protrusions and a top section that faces an open portion of the U-shaped section, whereby the top section of the clip may be positioned to engage a first section of either the second or third protrusions, thereby cooperating with the U-shaped section to hold the first glazing layer and the base plate together.

8. An integral collector storage system according to claim 3 wherein:
the heat exchange tubes have longitudinal axes that are aligned to be substantially parallel with a longitudinal axis of the tank system; and
a longitudinal axis of the first header pipe is substantially perpendicular to the longitudinal axis of the tank system.

9. An integral collector storage system as recited in claim 1 further comprising:
an insulating pad positioned between the base plate and the tank system;
a first header pipe arranged to interface with first ends of the heat exchange tubes; and
a second header pipe arranged to interface with second ends of the heat exchange tubes, whereby the fluid medium may be arranged to flow through the first header pipe into the first ends of the heat exchange tubes, through the heat exchange tubes and into the second header pipe; and
wherein each tank chamber has at least one of the heat exchange tubes passing therethrough;
wherein the second and third protrusions include respective first sections that extend substantially parallel to a corresponding portion of the first protrusion and second sections that are angled relative to the first sections; and
wherein the clip has a U-shaped section that is arranged to slide over the second sections of the second and third protrusions and a top section that faces an open portion of the U-shaped section, whereby the top section of the clip may be positioned to engage a first section of either the second or third protrusions, thereby cooperating with the U-shaped section to hold the first glazing layer and the base plate together.

10. An integral collector storage system according to claim 9 wherein the first glazing layer, the tank system, the first header pipe, the second header pipe and the heat exchangers are all formed from plastic materials.

11. An integral collector storage system as recited in claim 1 wherein the first glazing layer and the base plate are ribbed and the tank system has a plurality of interconnected tank chambers formed from tubes, the integral collector storage system further comprising:
a supply header pipe and a fluid return header pipe located on a first end of the tank system; and
wherein the plurality of heat exchange tubes have inlets coupled to the supply header pipe and outlets coupled to the return header pipe, the heat exchange tubes being inserted into the tank chambers from the first end of the tank system.

12. An integral collector storage system as recited in claim 11 further comprising a second glazing layer, the second glazing layer being positioned between the tank system and the first glazing layer, the second glazing layer including a forth protrusion interposed at least in part between the first and second protrusions and wherein the first glazing layer, the second glazing layer, the tank system and the heat exchangers are all formed from plastic materials.

13. An integral collector storage system as recited in claim 1 wherein the second and third protrusions are substantially L-shaped and the clip includes a U-shaped portion that slides over distal ends of the L-shaped second and third protrusions.

14. An integral collector storage system as recited in claim 1 wherein the clip comprises:
an elongated section, the elongated section having a first axis;
a first extension, the first extension being coupled to the elongated section, the first extension having a second axis that is substantially perpendicular to the first axis;
a second extension, the second extension being coupled to the elongated section, wherein the second extension includes a first portion and a second portion, the first portion having a third axis that is substantially perpendicular to the first axis, the second portion having a fourth axis that is substantially parallel to the first axis, wherein the elongated section, the first extension, and the second extension cooperate to hold the protrusions of the first glazing layer, the base, and the tank system together such that the first glazing layer and the tank system are held substantially immovably with respect to the base.

15. An integral collector storage system according to claim 14 wherein the elongated section, the first extension, and the second extension of the clip are formed from an aluminum material.

16. An integral collector storage system as recited in claim 3 wherein the heat exchanger tubes enter and exit the same side of the chamber tubes.

17. An integral collector storage system as recited in claim 6 wherein the first and second glazing layers are formed from a clear material and the tank system is formed from a dark material.

18. An integral collector storage system as recited in claim 1 wherein the first protrusion is integrally formed with the structure of the tank system.

19. An integral collector storage system as recited in claim 1 wherein the tank chambers are filled with a heat exchange fluid.

20. An integral collector storage system as recited in claim 19 wherein the heat exchange fluid is a liquid.

21. An integral collector storage system as recited in claim 20 wherein the liquid includes water.

22. An integral collector storage system as recited in claim 19 wherein the heat exchange fluid is the same as the working fluid medium.

23. An integral collector storage system as recited in claim 19 wherein the heat exchange fluid is different than the working fluid medium.

24. An integral collector storage system as recited in claim 1 wherein the chamber tubes are formed as part of a panel in which individual chamber tubes are spaced apart.

25. An integral collector storage system as recited in claim 24 wherein the panel includes a top plate that is attached to a bottom plate.

26. An integral collector storage system as recited in claim 1 wherein the heat exchange tubes arranged within the tank chamber enter and exit the same side of the tank chamber.

27. An integral collector storage system comprising:
a tank system having a plurality of interconnected tank chambers formed from tubes;
a plurality of heat exchange tubes arranged to contain a working fluid medium that is to be used outside of the integral collector system, the heat exchange tubes extending into the tank chambers;
a glazing layer positioned over the tank system; and a base plate positioned under the tank system, wherein the base plate and the glazing layer combine to contain the tank system, the structure of which is independent of the glazing layer and the base plate.

28. An integral collector storage system according to claim 27 wherein the glazing layer, the tank system and the heat exchangers are all formed from plastic materials.

29. An integral collector storage system as recited in claim 27 wherein the glazing layer, the tank system and the base plate each have protrusions extending therefrom, the integral collector storage system further comprising a clip arranged to be snapped over the protrusions to hold the integral collector storage system together.

30. An integral collector storage system as recited in claim 27 further comprising a supply header pipe and a fluid return header pipe located on a first end of the tank system, wherein the plurality of heat exchange tubes have inlets coupled to the supply header pipe and outlets coupled to the return header pipe, the heat exchange tubes being inserted into the tank chambers from the first end of the tank system.

31. An integral collector storage system as recited in claim 27 further comprising a second glazing layer, the second glazing layer being positioned between the tank system and the ribbed glazing layer.

32. An integral collector storage system as recited in claim 27 further comprising an insulating pad positioned between the base plate and the tank system.

33. An integral collector storage system as recited in claim 27 wherein the glazing layer, the tank system and the base plate each have protrusions extending therefrom, the integral collector storage system further comprising:

a clip arranged to be snapped over the protrusions to hold the integral collector storage system together;

an insulating pad positioned between the base plate and the tank system; and a supply header pipe and a fluid return header pipe located on a first end of the tank system, wherein the plurality of heat exchange tubes have inlets coupled to the supply header pipe and outlets coupled to the return header pipe, the heat exchange tubes being inserted into the tank chambers from the first end of the tank system; and wherein the glazing layer, the tank system and the heat exchangers are all formed from plastic materials.

34. An integral collector storage system as recited in claim 27 wherein the first gazing layer and the base plate are ribbed.

35. An integral collector storage system as recited in claim 34 wherein ribs are chevron shaped.

36. An integral collector storage system comprising:

a tank system having a plurality of interconnected tank chambers formed from tubes;

a supply header pipe and a fluid return header pipe located on a first end of the tank system;

a plurality of heat exchange tubes having inlets coupled to the supply header pipe and outlets coupled to the return header pipe, the heat exchange tubes being inserted into the tank chambers from the first end of the tank system;

a glazing layer positioned over the tank system; and a base plate positioned under the tank system, wherein the base plate and the glazing layer combine to contain the tank system, the structure of the tank system being independent of the first glazing layer and the base plate.

37. An integral collector storage system as recited in claim 36 wherein the first glazing layer and the base plate are ribbed.

38. An integral collector storage system according to claim 37 wherein the glazing layer, the tank system and the heat exchangers are all formed from plastic materials.

39. An integral collector storage system as recited in claim 36 wherein the glazing layer, the tank system and the base plate each have protrusions extending therefrom, the integral collector storage system further comprising a clip arranged to be snapped over the protrusions to hold the integral collector storage system together.

40. An integral collector storage system as recited in claim 36 further comprising a second glazing layer, the second glazing layer being positioned between the tank system and the first glazing layer.

41. An integral collector storage system as recited in claim 36 further comprising an insulating pad positioned between the base plate and the tank system.

42. An integral collector storage system as recited in claim 36 wherein the glazing layer, the tank system and the base plate each have protrusions extending therefrom, the integral collector storage system further comprising:

a clip arranged to be snapped over the protrusions to hold the integral collector storage system together;

an insulating pad positioned between the base plate and the tank system; and wherein the glazing layer and the base plate are ribbed and the glazing layer, the base plate, the tank system and the heat exchangers are all formed from plastic materials.

* * * * *

UNITED STATES PATENT AND TRADEMARK OFFICE
CERTIFICATE OF CORRECTION

PATENT NO. : 6,722,358 B2 Page 1 of 1
DATED : April 20, 2004
INVENTOR(S) : Richard O. Rhodes It is certified that error appears in the above-identified patent and that said Letters Patent is hereby corrected as shown below:

<u>Column 13,</u>
Line 47, change "gazing" to -- glazing --.

Signed and Sealed this

Twelfth Day of October, 2004

JON W. DUDAS
*Director of the United States Patent and Trademark Office*